US009509454B2

(12) United States Patent
Sobue (10) Patent No.: US 9,509,454 B2
(45) Date of Patent: Nov. 29, 2016

(54) SIGNAL TRANSMISSION SYSTEM, TRANSMISSION APPARATUS, RECEIVER APPARATUS, SIGNAL TRANSMISSION METHOD, TRANSMISSION APPARATUS CONTROL PROGRAM, AND RECEIVER APPARATUS CONTROL PROGRAM

(71) Applicant: NEC Corporation, Minato-ku, Tokyo (JP)

(72) Inventor: Toshiharu Sobue, Tokyo (JP)

(73) Assignee: NEC CORPORATION, Tokyo (JP)

(*) Notice: Subject to any disclaimer, the term of this patent is extended or adjusted under 35 U.S.C. 154(b) by 11 days.

(21) Appl. No.: 14/662,677

(22) Filed: Mar. 19, 2015

(65) Prior Publication Data
US 2015/0280869 A1 Oct. 1, 2015

(30) Foreign Application Priority Data
Mar. 27, 2014 (JP) .................................. 2014-065795

(51) Int. Cl.
*H04L 1/20* (2006.01)
*G06F 13/40* (2006.01)

(52) U.S. Cl.
CPC .............. *H04L 1/20* (2013.01); *G06F 13/4072* (2013.01); *Y02B 60/1228* (2013.01); *Y02B 60/1235* (2013.01)

(58) Field of Classification Search
CPC ........... H04L 25/03885; H04L 1/0045; H04L 25/028; H04L 1/20; H04W 52/06; G06F 13/4072; Y02B 60/1235; Y02B 60/1228
See application file for complete search history.

(56) References Cited

U.S. PATENT DOCUMENTS

| | | | |
|---|---|---|---|
| 5,987,307 A * | 11/1999 | Buskirk | H04W 52/52 375/219 |
| 8,188,770 B2 * | 5/2012 | Sakamaki | H03K 19/017509 327/108 |
| 2004/0192218 A1 * | 9/2004 | Oprea | H04L 25/03343 455/73 |
| 2006/0250158 A1 * | 11/2006 | Yaguchi | H03K 19/0005 326/86 |

FOREIGN PATENT DOCUMENTS

| | | |
|---|---|---|
| JP | S61176222 A | 8/1986 |
| JP | H04167836 A | 6/1992 |
| JP | H08251141 A | 9/1996 |
| JP | 2002223204 A | 8/2002 |
| JP | 2006-148389 A | 6/2006 |
| JP | 2006157448 A | 6/2006 |
| WO | 03/090374 A1 | 10/2003 |

OTHER PUBLICATIONS

Japanese Office Action for JP Application No. 2014-065795 mailed on Jan. 1, 2015 with English Translation.
Japanese Final Office Action for JP Application No. 2014-065795 mailed on Mar. 24, 2015 with English Translation.

* cited by examiner

Primary Examiner — Vineeta Panwalkar (57) ABSTRACT

A signal transmission system includes a transmission apparatus provided with a transmitting device which outputs a transmitting data signal as a transmission signal using a driving ability designated by a drive control signal, and a drive control device which outputs a drive control signal based on a transmission timing signal and a determination notice signal for notifying reception quality; and a receiver apparatus provided with a receiving device which receives the transmission signal and outputs a received signal, a timing generating device which generates a received timing signal from the received signal, and a determining device which determines reception quality of the received signal using the received timing signal, and outputs the determination result as the determination notice signal.

11 Claims, 7 Drawing Sheets

SIGNAL TRANSMISSION SYSTEM, TRANSMISSION APPARATUS, RECEIVER APPARATUS, SIGNAL TRANSMISSION METHOD, TRANSMISSION APPARATUS CONTROL PROGRAM, AND RECEIVER APPARATUS CONTROL PROGRAM

This application is based upon and claims the benefit of priority from Japanese Patent Application No. 2014-065795, filed on Mar. 27, 2014, the disclosure of which is incorporated herein in its entirety by reference.

TECHNICAL FIELD

The present invention relates to a signal transmission system, a transmission apparatus, a receiver apparatus, a signal transmission method, a transmission apparatus control program, and a receiver apparatus control program capable of reducing electric power required for signal transmission, while securing reception quality.

BACKGROUND ART

In recent years, as development of a high-speed information processing apparatus has progressed, power consumption of the information processing apparatus tends to increase. In particular, this trend is remarkable in an information processing apparatus provided with a large number of high speed interfaces. In view of the above, it has been an important issue to reduce power consumption required for signal transmission.

Japanese Laid-open Patent Publication No. 2006-148389 (hereinafter, called as "Patent Literature 1") discloses a technique of optimizing transmission power in an interface configured to perform data transmission between semiconductor devices. Specifically, in the technique disclosed in Patent Literature 1, a determination result of reception quality upon receiving test data is transmitted from a receiver side to a transmission side. The transmission side adjusts an output level of test data based on the determination result from the receiver side. In the technique disclosed in Patent Literature 1, the output level for securing reception quality is optimized by adjusting the output level of test data. In the technique disclosed in Patent Literature 1, when the optimized output level is obtained, the transmission side replaces the test data with ordinary transmission data, and starts transmitting.

International Patent Publication No. WO2003/090374 (hereinafter, called as "Patent Literature 2") discloses a technique that a receiver side transmits an evaluation result of a received waveform to a transmission side, and the transmission side adjusts an output parameter based on the evaluation result for waveform shaping. Specifically, a transmitted waveform in an output driver in Patent Literature 2 is shaped by allowing the transmission side to adjust an output parameter of the output driver so as to minimize distortion of a receiverd waveform, based on an evaluation result of the distortion of the received waveform transmitted to the transmission side.

SUMMARY

An object of the present invention is to provide a signal transmission system, a transmission apparatus, a receiver apparatus, a signal transmission method, a transmission apparatus control program, and a receiver apparatus control program capable of reducing electric power required for signal transmission, while securing reception quality.

A signal transmission system according to the present invention is characterized by including a transmission apparatus that includes a transmitting device that outputs a transmission data signal as a transmission signal using a driving ability designated by a drive control signal, and a drive control device that outputs the drive control signal, based on a transmission timing signal and a determination notice signal for notifying reception quality, and a receiver apparatus that includes a receiving device that receives the transmission signal and outputs a received signal, a timing generating device that generates a received timing signal from the received signal, and a determining device that determines the reception quality of the received signal using the received timing signal, and outputs the determination result as the determination notice signal.

A transmission apparatus according to the present invention is characterized by including a transmitting device that outputs a transmission data signal as a transmission signal using a driving ability designated by a drive control signal, and a drive control device that outputs the drive control signal, based on the determination notice signal and a transmission timing signal from a receiver apparatus that includes a receiving device that receives the transmission signal and outputs a received signal, a timing generating device that generates a received timing signal from the received signal, and a determining device that determines the reception quality of the received signal using the received timing signal, and outputs the determination result as the determination notice signal.

A signal transmission method of the present invention is characterized by outputting a transmission data signal as a transmission signal using a driving ability designated by a drive control signal, outputting the drive control signal, based on a transmission timing signal and a determination notice signal for notifying reception quality, receiving the transmission signal, outputting a received signal, generating a received timing signal based on the received signal, determining the reception quality of the received signal using the received timing signal, and outputting the determination result as the determination notice signal.

BRIEF DESCRIPTION OF THE DRAWINGS

Exemplary features and advantages of the present invention will become apparent from the following detailed description when taken with the accompanying drawings in which.

EXEMPLARY EMBODIMENT

In the following, an exemplary embodiment of the present invention is described in detail referring to the drawings.

First Exemplary Embodiment

Figure 1:
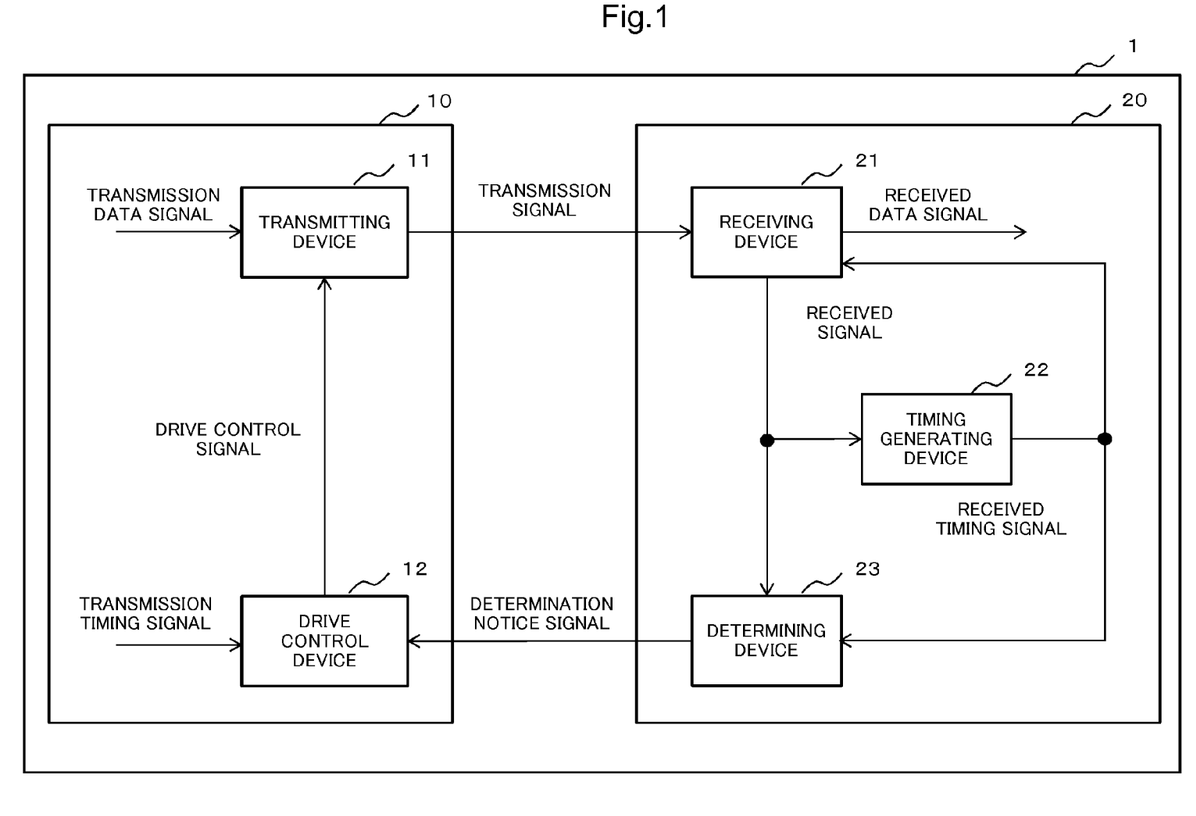
FIG. 1 is a block diagram illustrating a configuration example of a signal transmission system according to a first exemplary embodiment of the present invention.
Figure 2:
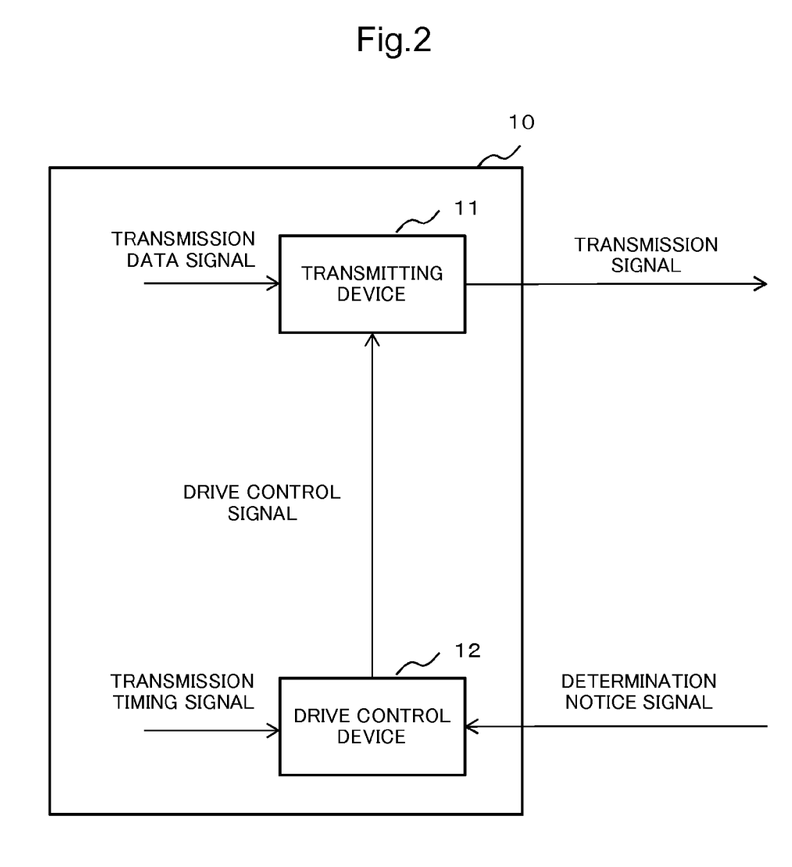
FIG. 2 is a block diagram illustrating a configuration example of a transmission apparatus according to the first exemplary embodiment of the present invention.
Figure 3:
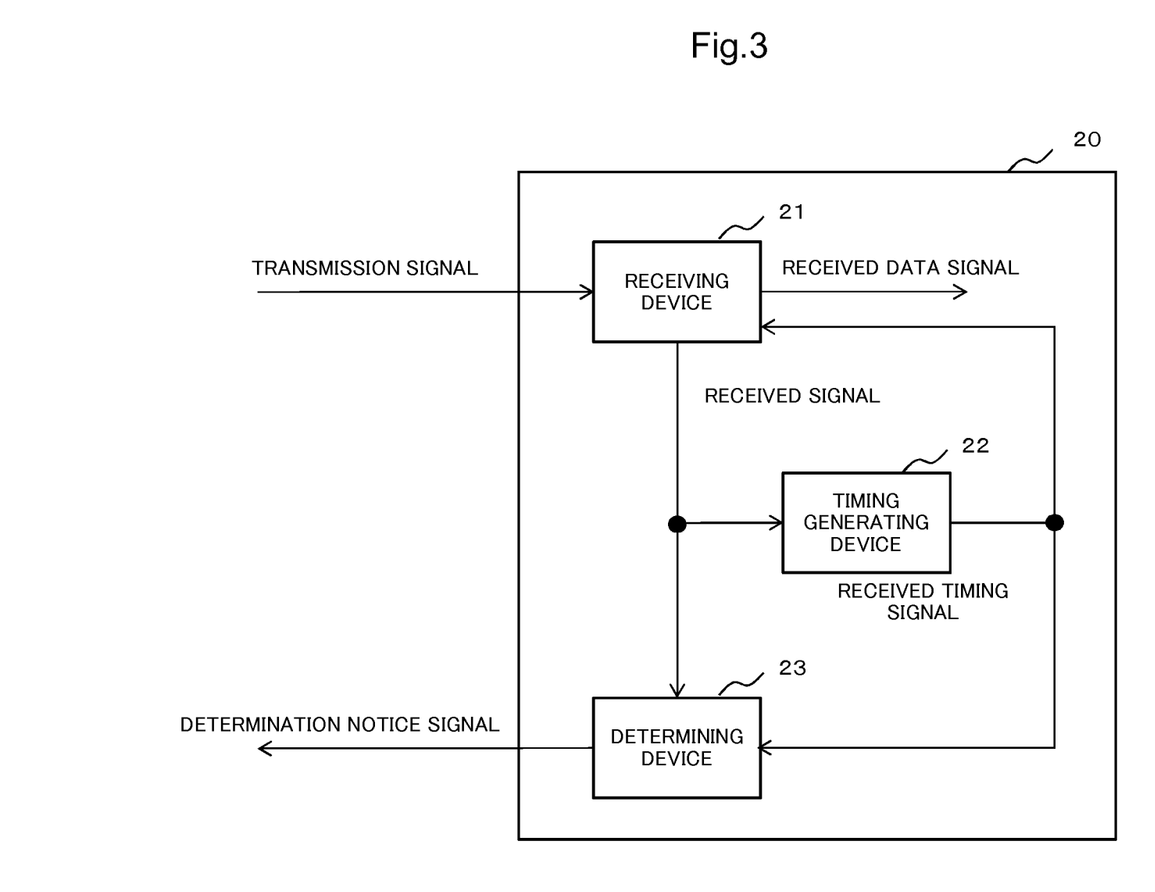
FIG. 3 is a block diagram illustrating a configuration example of a receiver apparatus according to the first exemplary embodiment of the present invention.

A first exemplary embodiment of the present invention is described. FIG. 1 is a block diagram illustrating a configuration example of a signal transmission system 1 according to the present exemplary embodiment. FIG. 2 is a block diagram illustrating a configuration example of a transmission apparatus 10 according to the present exemplary embodiment. FIG. 3 is a block diagram illustrating a configuration example of a receiver apparatus 20 according to the present exemplary embodiment.

A configuration of the signal transmission system 1 is described referring to FIGS. 1 to 3. The signal transmission system 1 includes the transmission apparatus 10 and the receiver apparatus 20.

The transmission apparatus 10 includes transmitting device 11 and drive control device 12.

The transmitting device 11 is provided with a plurality of sizes of "driving ability." The driving ability, with which the transmitting device 11 drives a transmission data signal, is designated, based on a drive control signal from the drive control device 12 to be described later. The transmitting device 11 outputs the transmission data signal using the designated driving ability, and outputs the transmitting data signal as a transmitting signal.

The "driving ability" is an ability of driving a transmission line of a transmission signal or an input impedance of the receiver side as a load. The driving ability is represented by, for example, an output current value. The transmitting device 11 drives a transmission data signal either in a driving state by an ordinary driving ability (hereinafter, called as "ordinary driving"), or in a driving state by a driving ability lower than the driving ability of the ordinary driving (hereinafter, called as "suppressive driving").

The drive control device 12 generates a drive control signal from a transmission timing signal, based on a determination notice signal from outside. The drive control signal is a signal for designating a driving state to be applied at each time point represented by the transmission timing signal, among a plurality of driving states provided in the transmitting device 11. In the present exemplary embodiment, when the drive control signal is "1", the ordinary driving is designated to the transmitting device 11. When the drive control signal is "0", the suppressive driving is designated to the transmitting device 11.

Specifically, the drive control device 12 controls the driving state as follows. A time duration from a changing point of a data value of a transmission data signal to a next changing point is called as a "data period". The drive control device 12 designates a driving state in each time segment obtained by dividing the data period into a plurality of time segments.

For example, the data period is divided into two of a first half time segment and a second half time segment. In this case, a data value in the first half time segment may vary from a data value in an immediately preceding data period. Therefore, the drive control device 12 designates the ordinary driving having a high driving ability as driving of the first half time segment. A data value in the second half time segment is the same as the data value in the first half time segment. Therefore, the drive control device 12 designates the suppressive driving as driving of the second half time segment. The drive control device 12 outputs a drive control signal for designating a driving ability as described above, based on a transmission timing signal. The drive control device 12 outputs a drive control signal for designating the ordinary driving in the first half time segment of a data period. The drive control device 12 outputs a drive control signal for designating the suppressive driving in the second half time segment of the data period. In this way, the drive control device 12 designates the suppressive driving in the second half time segment of the data period. Thus, the transmitting device 11 outputs a transmission data signal using the suppressive driving designated in the second half time segment of the data period, resulting in reducing electric power required for transmitting.

The drive control device 12 changes the driving state designated in each time segment of the data period, based on a determination notice signal from outside. For example, when a determination notice signal represents that reception quality in the second half time segment is not secured, the drive control device 12 changes the driving state designated in the second half time segment to a state having a higher driving ability. On the other hand, when a determination notice signal represents that reception quality in the second half time segment is secured, the drive control device 12 changes the driving state designated in the second half time segment to a state having a lower driving ability. In this way, the drive control device 12 adjusts the driving ability while securing reception quality, based on a determination notice signal. The drive control device 12 successively designates a driving ability to the transmitting device 11.

The driving ability can be adjusted at arbitrary timing. The driving ability may be adjusted at any time, or may be adjusted in a predetermined cycle. The drive control device 12 adjusts the driving ability so that reception quality is secured in response to a change in the environment such as a transmission line, and designates the driving ability to the transmitting device 11. Thus, the transmitting device 11 can reduce electric power required for transmitting.

The receiver apparatus 20 includes receiving device 21, timing generating device 22, and determining device 23.

The timing generating device 22 generates a received timing signal from a received signal to be described later.

The receiving device 21 receives a transmission signal, and outputs the received transmission signal as a received signal. Further, the receiving device 21 reproduces a received data signal from the transmission signal, based on a received timing signal. Specifically, the received data signal is a signal reproduced from the transmission signal, using the received timing signal, and includes the same data as the transmission data signal.

The determining device 23 determines reception quality of the received signal, based on the received timing signal, and outputs the determination result as a determination notice signal. Specifically, for example, the determining device 23 samples the received signal in each time segment obtained by dividing a data period of the received signal. The determining device 23 observes a received internal data signal in each time segment, which is obtained by sampling, and determines reception quality. The determining device 23 checks whether or not data values in the respective time segments of the data period of the received internal data signal match with one another. For example, when a data period is divided into two time segments, the determining device 23 checks whether or not a data value in the first half time segment of the data period matches with a data value in the second half time segment. When the data value in the first half time segment matches with the data value in the second half time segment, the determining device 23 outputs a determination notice signal representing matching of the data value in the second half time segment. On the other hand, when the data value in the first half time segment does not match with the data value in the second half time segment, the determining device 23 outputs a determination notice signal representing mismatching of the data value in the second half time segment.

Figure 4:
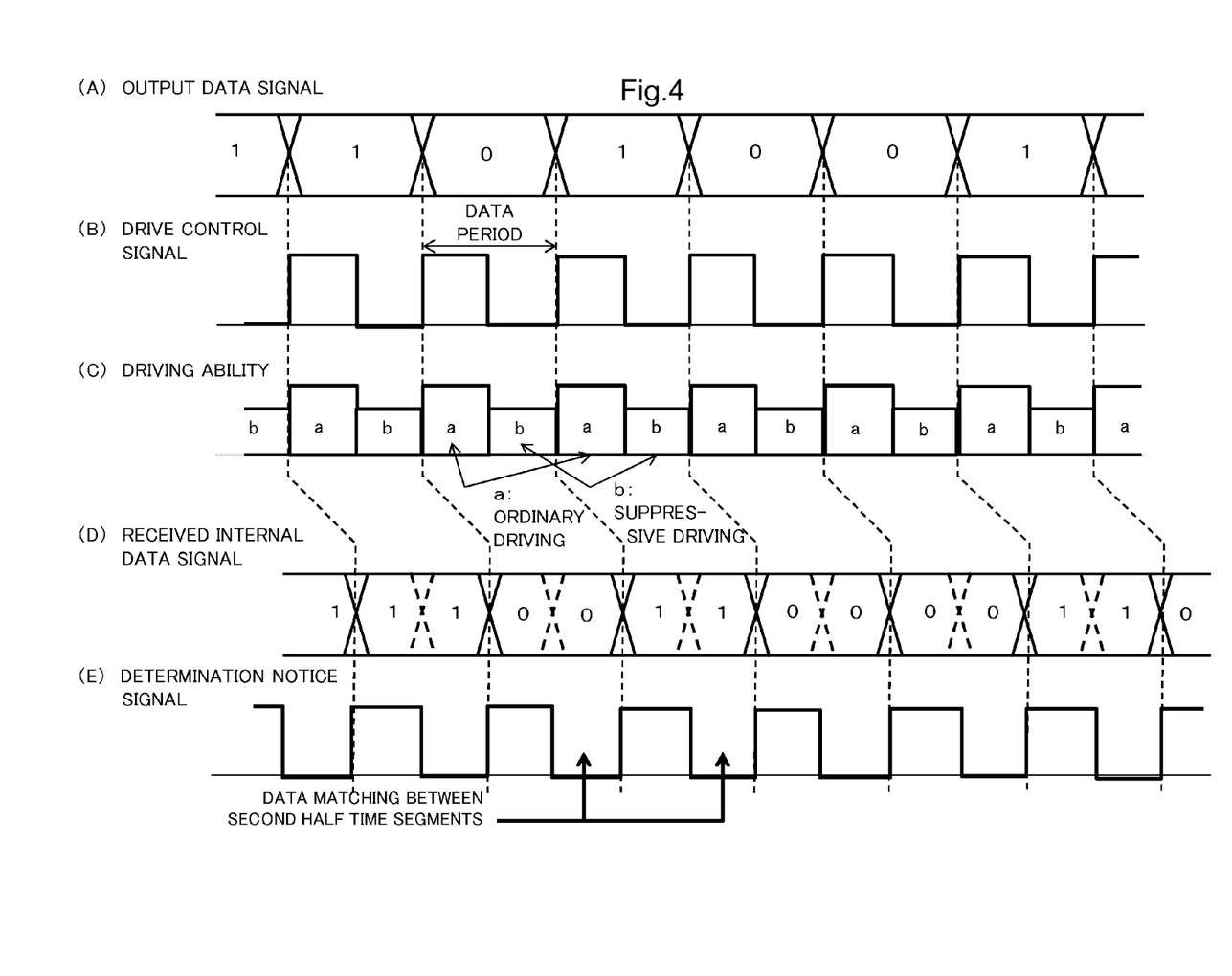
FIG. 4 is a timing chart illustrating an operation example of the signal transmission system according to the first exemplary embodiment of the present invention.

FIG. 4 is a timing chart illustrating an operation example of the signal transmission system 1 according to the present exemplary embodiment. The operation of the signal transmission system 1 according to the present exemplary embodiment is described referring to FIG. 4.

FIG. 4(A) illustrates a data array of an output data as a transmission data signal. FIG. 4(B) illustrates a drive control signal from the drive control device 12. FIG. 4(C) illustrates a driving ability designated to the transmitting device 11 by a drive control signal.

In FIG. 4, a data period is divided into two of a first half time segment and a second half time segment. In an initial state, the ordinary driving "a" is designated to the transmitting device 11 in the first half time segment, and the suppressive driving "b" is designated in the second half time segment, based on the drive control signal. Thereafter, the driving state of the transmitting device 11 is designated, based on a state of reception quality.

In FIG. 4, the transmitting device 11 outputs the output data signal (A) while the driving ability (C) is designated based on the drive control signal (B) from the drive control device 12.

FIG. 4(D) represents a data array of a received internal data signal obtained by sampling a received signal based on a received timing signal. The determining device 23 determines whether or not a data value in the first half time segment of a data period matches with a data value in the second half time segment. FIG. 4(E) is a determination notice signal representing a determination result. The determination notice signal in the second half time segment is indicated as "0", when a data value in the first half time segment of the data period matches with a data value in the second half time segment. The determination notice signal in the second half time segment is indicated as "1", when a data value in the first half time segment does not match with a data value in the second half time segment.

As described above, the transmitting device 11 outputs a transmission data signal, with the ordinary driving "a" designated in the first half time segment of the data period and the suppressive driving "b" designated in the second half time segment. This allows the transmitting device 11 to reduce electric power required for transmitting.

In the exemplary embodiment described above, there are two levels of the driving state of the transmitting device 11, with the ordinary driving and the suppressive driving. There may be three or more levels of the driving state. In case of three levels, one of the ordinary driving "a", the suppressive driving "b", and the suppressive driving "c" is designated to the driving state of the transmitting device 11. The suppressive driving "c" has a driving ability lower than the driving ability of the suppressive driving "b". The drive control signal may be a signal of three values or more, or may be a signal of 2 bits or more in order to designate one of three or more states.

Figure 5:
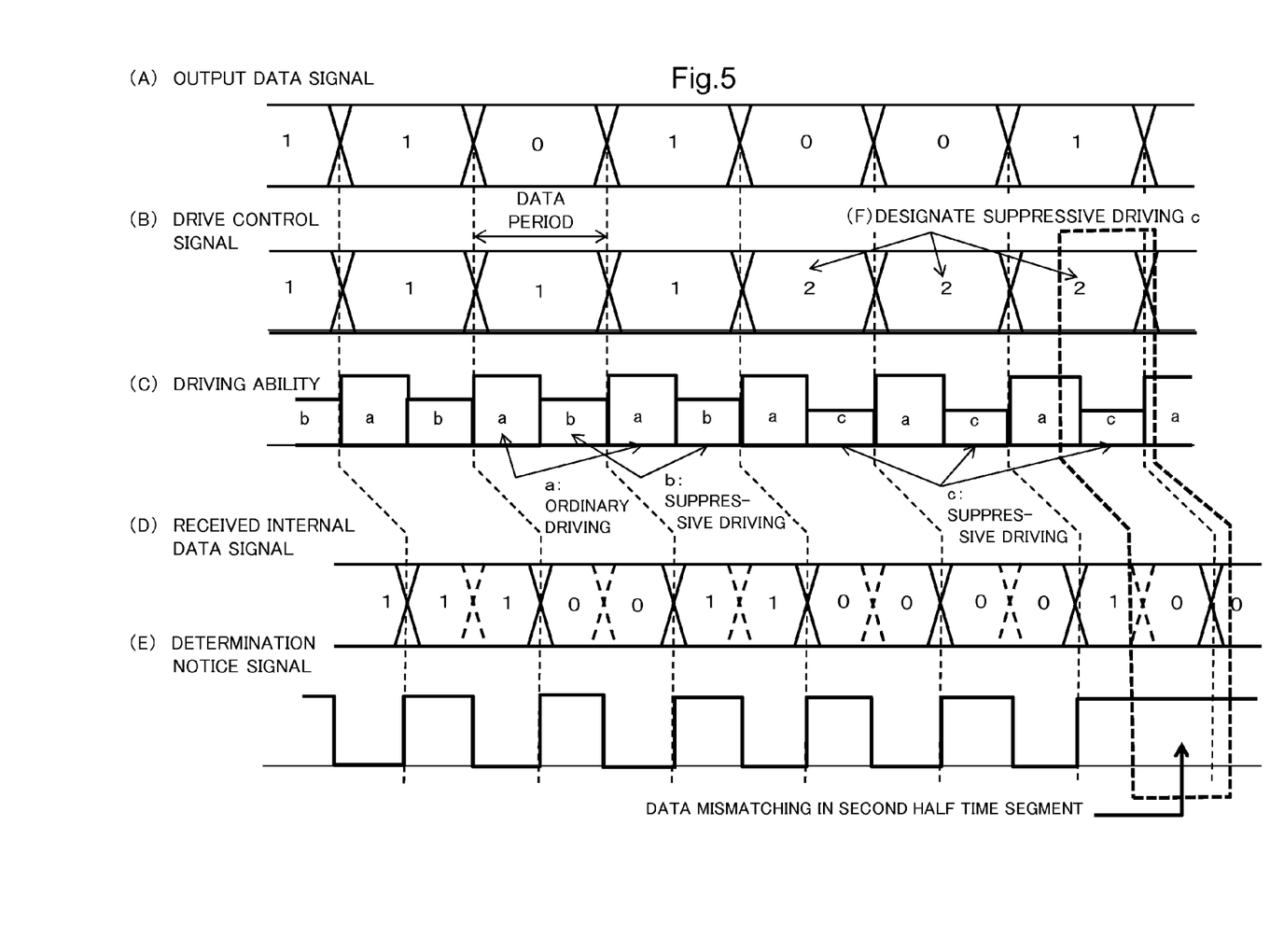
FIG. 5 is a timing chart illustrating another operation example of the signal transmission system according to the first exemplary embodiment of the present invention.

FIG. 5 is a timing chart illustrating another operation example of the signal transmission system 1 according to the present exemplary embodiment. Another operation example of the signal transmission system 1 according to the present exemplary embodiment is described referring to FIG. 5. There are three levels of the driving state, with the ordinary driving "a", the suppressive driving "b", and the suppressive driving "c" described above, in the transmitting device 11 according to the present exemplary embodiment. The drive control signal (B) is a 2-bit signal. The ordinary driving "a" is designated in the second half time segment when the drive control signal (B) is "0". The suppressive driving "b" is designated in the second half time segment when the drive control signal (B) is "1". The suppressive driving "c" is designated in the second half time segment when the drive control signal (B) is "2".

In FIG. 5, the suppressive driving "b" is designated in the first half time segment, and the suppressive driving "c" is designated in the second half time segment. In FIG. 5, designation of the driving ability is changed at timing (F). For example, designation is changed from the suppressive driving "b" to the suppressive driving "c" in a predetermined cycle as adjustment of the driving ability as described above.

At the timing (F), the drive control signal (B) designates the suppressive driving "c". By the designation, the driving state of the transmitting device 11 is changed from the suppressive driving "b" to the suppressive driving "c". By the change, the transmitting device 11 outputs a transmission data signal with the ordinary driving "a" designated in the first half time segment of the data period and the suppressive driving "c" designated in the second half time segment. This allows the transmitting device 11 to further reduce electric power required for transmitting.

A case that data become mismatched in the second half time segment of the data period of FIG. 5, is described. A portion indicated as "data mismatching in second half time segment" at timing (G) in FIG. 5, which is surrounded by a dotted line, is described.

The driving ability of the transmitting device 11 is changed from the suppressive driving "b" to the suppressive driving "c" in the second half time segment of the data period at the timing (F) described above, based on the drive control signal (B) from the drive control device 12. This change is, for example, performed in a predetermined cycle by the drive control device 12 as adjustment of the driving ability as described above. The determining device 23 determines the received internal data signal (D). The determining device 23 outputs the determination notice signal (E) representing that mismatching between a data value in the first half time segment of the data period and a data value in the second half time segment is detected, based on the determination result, at the timing (G).

The drive control device 12 is notified based on the determination notice signal (E) that data mismatching in the second half time segment is detected. The drive control device 12 judges whether or not reception quality is good after the driving state is changed to the suppressive driving "c". For example, the drive control device 12 accumulates the number of times when data mismatching in the second half time segment is notified during a predetermined period after the driving state is changed to the suppressive driving "c", based on the determination notice signal. When the accumulation result is equal to or smaller than a predetermined threshold value, the drive control device 12 judges that reception quality is secured. When the accumulation result above exceeds the predetermined threshold value, the drive control device 12 judges that reception quality is not secured.

When reception quality is not secured, based on the judgment result of reception quality, the drive control device 12 outputs a drive control signal for changing from the suppressive driving "c to the suppressive driving "b" having a higher driving ability. This change allows the drive control device 12 to enhance the driving ability and to secure reception quality. On the other hand, when reception quality is secured, the drive control device 12 continues to designate the suppressive driving "c".

Figure 6:
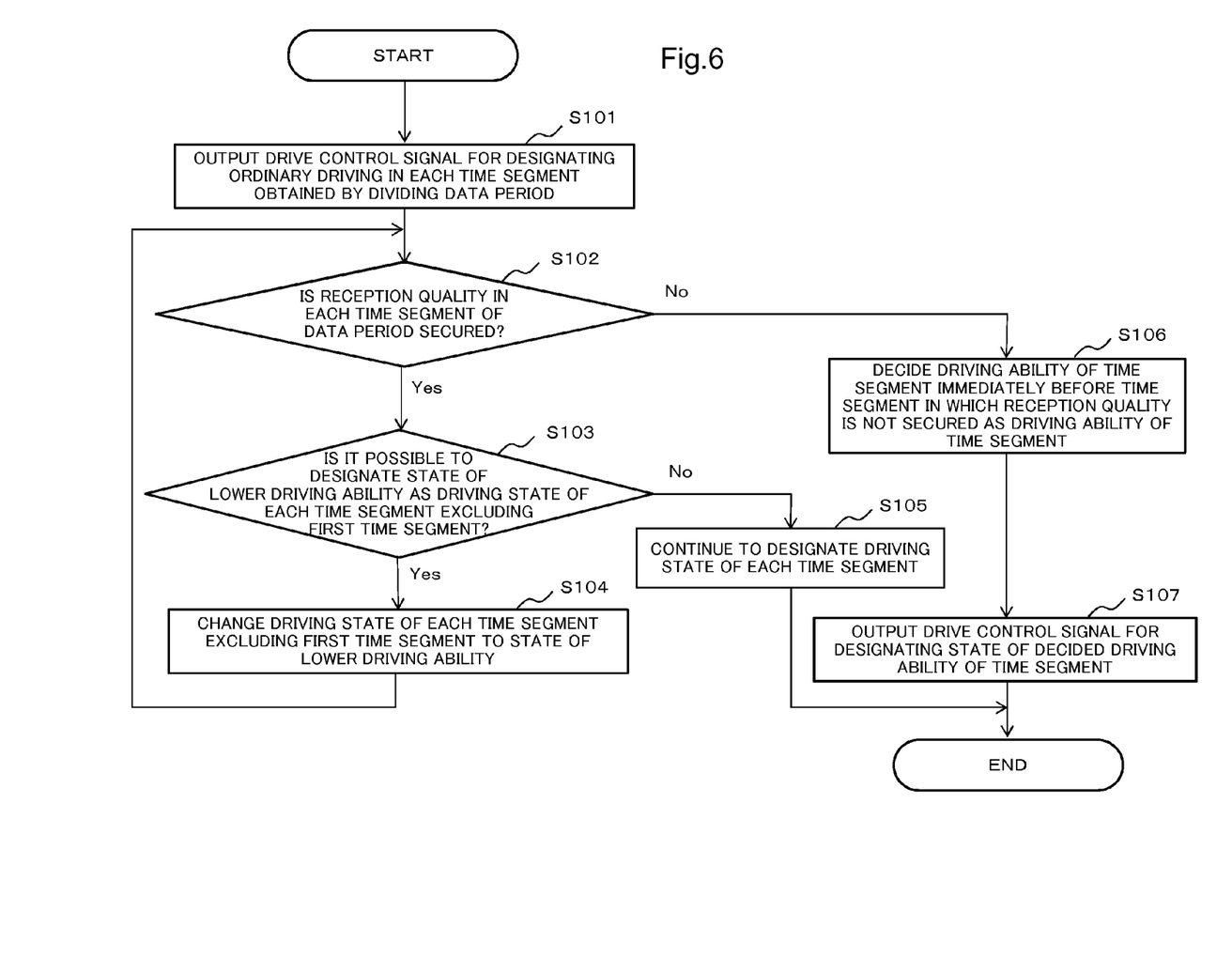
FIG. 6 is a flowchart illustrating an operation example of the transmission apparatus according to the first exemplary embodiment of the present invention.

FIG. 6 is a flowchart exemplifying an operation of the transmission apparatus 10 according to the present exemplary embodiment. The operation of the transmission apparatus 10 is described referring to FIG. 6.

The drive control device 12 outputs a drive control signal for designating the ordinary driving in each time segment obtained by dividing a data period into a plurality of time segments (Step S101).

The drive control device 12 checks whether or not reception quality is secured in each time segment of a data period, based on a determination notice signal received from the receiver apparatus 20 (Step S102). When reception quality in each time segment is secured (Yes in Step S102), the drive control device 12 checks whether or not it is possible to designate a state of a lower driving ability as the driving state of each time segment excluding the first time segment (Step S103). This checking is performed in order to confirm whether it is possible to designate, to the transmitting device 11, a driving state of a lower driving ability than the driving state currently designated to the transmitting device 11. When it is confirmed that the aforementioned designation is possible (Yes in Step S103), the drive control device 12 outputs a drive control signal for designating a state of a lower driving ability as the driving state of each time segment excluding the first time segment (Step S104), and the processing returns to Step S102. On the other hand, when it is confirmed that the aforementioned designation is not possible (No in Step S103), the drive control device 12 decides to continue designation of the driving state of each time segment (Step S105), and the processing is ended.

When reception quality of a certain time segment (hereinafter, called as a time segment T) is not secured (No in Step S102), the drive control device 12 decides the driving ability of a time segment immediately before the time segment T as the driving ability of the time segment T (Step S106). Then, the drive control device 12 outputs a drive control signal for designating a driving state of the decided driving ability to the time segment T (Step S107), and the processing is ended.

Figure 7:
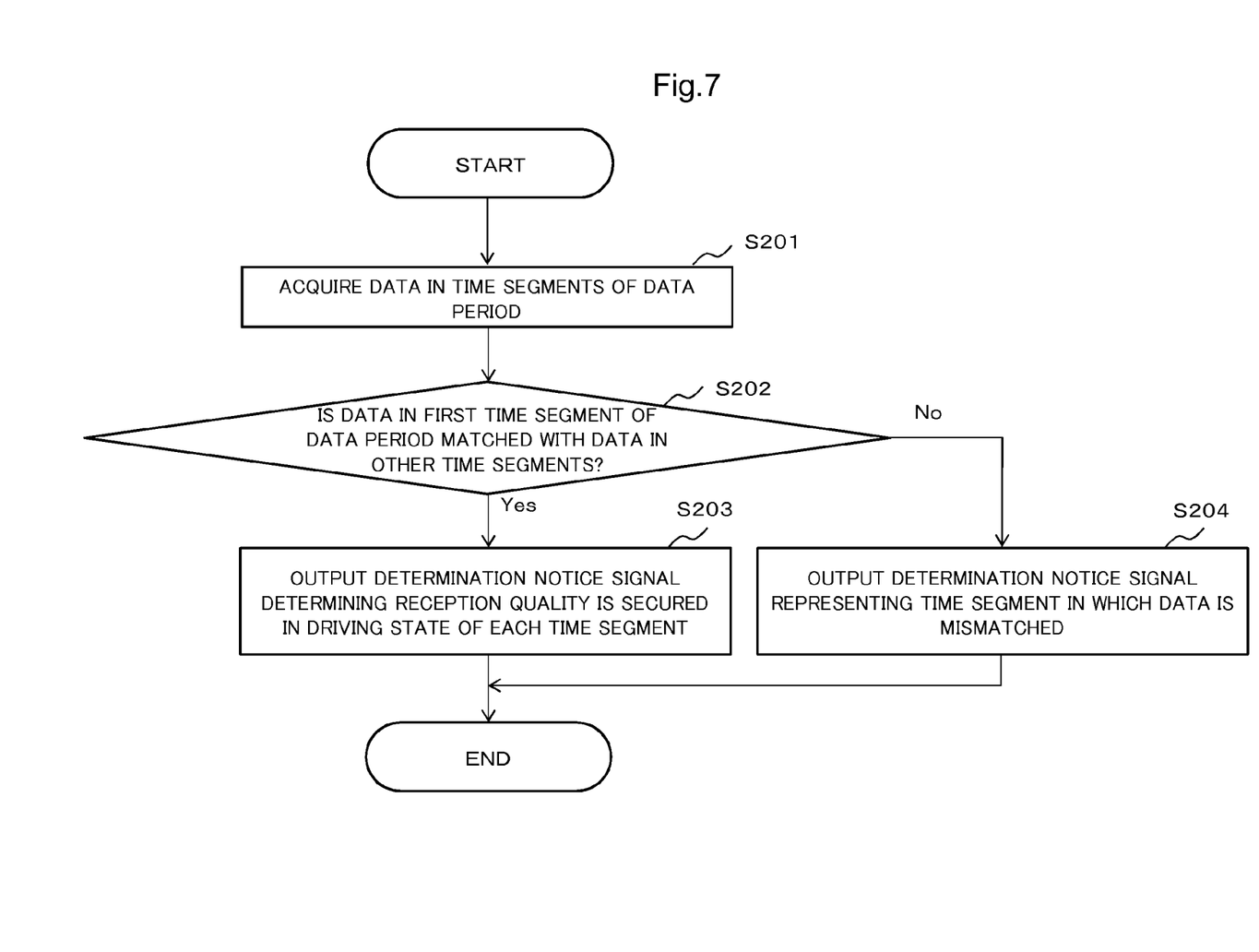
FIG. 7 is a flowchart illustrating an operation example of the receiver apparatus according to the first exemplary embodiment of the present invention.

FIG. 7 is a flowchart exemplifying an operation of the receiver apparatus 20 according to the present exemplary embodiment. The operation of the receiver apparatus 20 is described referring to FIG. 7.

The determining device 23 acquires a data value in each time segment obtained by dividing a data period of a received signal into a plurality of time segments (Step S201). The determining device 23 checks whether or not a data value in the first time segment of the data period matches with data values in the other time segments (Step S202).

When a data value in the first time segment of the data period matches with data values in the other time segments (Yes in Step S202), the determining device 23 outputs a determination notice signal representing that reception quality in each time segment is secured (Step S203). When the data value in the first time segment does not match with a data value in one of the other time segments (No in Step S202), the determining device 23 outputs a determination notice signal representing a time segment in which the data value is mismatched (Step S204).

As described above, the transmission apparatus 10 according to the present exemplary embodiment outputs a transmission data signal with a driving state designated in each time segment obtained by dividing a data period into a plurality of time segments. The determining device 23 of the receiver apparatus 20 determines reception quality of a received signal, and transmits the determination result as a determination notice signal. The transmission apparatus 10 judges reception quality based on the determination notice signal, and changes designation of the driving state described above for securing reception quality. In this way, the signal transmission system according to the present exemplary embodiment adjusts the driving state for driving a transmission data signal based on reception quality. Therefore, in the present exemplary embodiment, it is possible to reduce electric power required for signal transmission, while securing reception quality.

Further, in the present exemplary embodiment, test data for checking reception quality is not used. Therefore, in the present exemplary embodiment, data transmission efficiency is not lowered due to transmission of test data. Furthermore, in the present exemplary embodiment, since reception quality is checked using a transmission data signal, it is possible to respond to a change in reception quality by checking reception quality at any time.

In the present exemplary embodiment, it is described that a data period is divided into two time segments. However, a data period is not necessarily divided into two time segments. For example, a data period may be divided into three time segments. A case that a data period is divided into three time segments will be described later.

Further, in the present exemplary embodiment, it is described that three levels of the driving ability are provided in the transmitting device 11. However, the number of levels of the driving ability provided in the transmitting device 11 is not necessarily three. For example, the transmitting device 11 may be provided with one ordinary driving and one suppressive driving, or may be provided with one ordinary driving and three or more levels of suppressive driving.

In the following, a case that a data period is divided into three time segments and there are four levels of the driving ability, is described. In other words, it is possible to designate four levels of driving with an ordinary driving and three levels of suppressive driving, as a driving state.

The drive control device 12 designates the ordinary driving in the first time segment 1 obtained by dividing a data period into three time segments, and also designates the ordinary driving in the successive two time segments 2 and 3, as initial values. When it is judged that reception quality in the time segments 2 and 3 is secured by a determination notice signal after the designation, the drive control device 12 designates the suppressive driving 1 having the highest driving ability among levels of the suppressive driving, as the driving state in the time segments 2 and 3. When it is judged that reception quality in the time segments 2 and 3 is secured by a determination notice signal after the designation, the drive control device 12 designates the suppressive driving 2 having the second highest driving ability is among levels of the suppressive driving, as the driving state in the time segments 2 and 3. When it is judged that reception quality in the time segments 2 and 3 is secured by a determination notice signal after the designation, the drive control device 12 designates the suppressive driving 3 having the lowest driving ability among levels of the suppressive driving, as the driving state in the time segments 2 and 3.

When it is judged that reception quality in the time segments 2 and 3 is secured by a determination notice signal after the designation, the drive control device 12 continues to designate the driving state in the time segments 2 and 3, since there is no driving state having lower driving ability than the driving ability of the driving state in the time segments 2 and 3. Specifically, the drive control signal continues to designate the ordinary driving in the time segment 1, and to designate the suppressive driving 3 in the time segments 2 and 3.

However, when data mismatching between received data in the time segments 2 and 3, and data in the first time segment is notified by a determination notice signal after designation of the suppressive driving 3 in the time segments 2 and 3, the drive control device 12 changes the driving state of the time segments 2 and 3 to the suppressive driving 2 having higher driving ability by one level.

When it is judged that reception quality in the time segment 3 is secured by a determination notice signal after the change, the drive control device 12 designates the suppressive driving 3 having the lowest driving ability among levels of the suppressive driving, as the driving state of the time segment 3.

When it is judged that reception quality in the time segment 3 is secured by a determination notice signal after the designation, the drive control device 12 continues to designate the suppressive driving 3 to the time segment 3. Specifically, the drive control signal continues to designate the ordinary driving to the time segment 1, designate the suppressive driving 2 to the time segment 2, and designate the suppressive driving 3 to the time segment 3.

As described above, the drive control device 12 judges reception quality in each time segment obtained by dividing a data period, and stepwisely adjusts the driving state of each time segment. The transmitting device 11 outputs a transmission data signal using the adjusted driving ability, resulting in enabling to reduce electric power required for transmitting.

Alternatively, a plurality of driving abilities provided in the transmitting device 11 may be implemented by properly selecting an output, as necessary, among a plurality of outputs of an output driver provided in association with the respective driving abilities. Further, the plurality of driving abilities provided in the transmitting device 11 may be implemented by selectively overlapping the plurality of outputs of the output driver as the respective driving abilities. In any of the configurations, the transmitting device 11 can implement a driving ability based on a drive control signal.

Further, in the present exemplary embodiment, it is described that the determining device 23 determines reception quality by judging whether or not data values are matched between the first time segment and the other time segments obtained by dividing a data period into a plurality of time segments. However, the determination method of reception quality is not limited to the above.

For example, the determining device 23 may determine reception quality by evaluating a signal waveform of a received signal. For example, the determining device 23 may determine a signal waveform using a predetermined threshold value. Specifically, the determining device 23 samples a signal waveform of a received signal based on a received timing signal, and, for example, measures a feature value of the signal waveform such as a rise time and a fall time of the signal waveform, an amplitude of jitter, and an overshoot value and an undershoot value. When the measured feature value is within a predetermined threshold value, the determining device 23 outputs a determination notice signal representing that any feature values do not exceed the threshold value. On the other hand, when one of the measured feature values exceeds the predetermined threshold value, the determining device 23 outputs a determination notice signal representing a feature amount exceeding the threshold value. In this way, the determining device 23 may output a determination notice signal, based on a determination result of a signal waveform using a predetermined threshold value.

The drive control device 12 judges reception quality, based on a determination notice signal as described above. In this case, for example, the drive control device 12 accumulates the number of times when each feature value of a signal waveform exceeds a threshold value during a predetermined period. When one of the accumulation values exceeds a judgment threshold value that is set in advance to each accumulation value, the drive control device 12 may judge that reception quality is not secured. Then, the drive control device 12 may adjust the driving ability, based on the judgment result of reception quality.

A manner of changing the driving state necessary for enhancement of reception quality may differ depending on an evaluation item of reception quality. Specifically, in some cases, it is necessary to change the driving state to a driving state of a higher driving ability, and in other cases, it is necessary to change the driving state to a driving state of a lower driving ability, in order to enhance reception quality. In view of the above, it is desirable for the drive control device 12 to adjust the driving ability, based on a judgment result of reception quality, taking into consideration relationship between reception quality and an evaluation item.

Further, the timing charts of the signal transmission system illustrated in FIGS. 4 and 5 illustrate operation examples of the signal transmission system according to the present exemplary embodiment. The operation of the signal transmission system is not limited to those illustrated in the timing charts.

Further, the flowchart of the transmission apparatus illustrated in FIG. 6 illustrates an operation example of the transmission apparatus according to the present exemplary embodiment. The operation of the transmission apparatus is not limited to the operation illustrated in the flowchart.

Further, the flowchart of the receiver apparatus illustrated in FIG. 7 illustrates an operation example of the receiver apparatus according to the present exemplary embodiment. The operation of the receiver apparatus is not limited to the operation illustrated in the flowchart.

The present invention is not limited to the exemplary embodiment described above, but may be altered or modified in various ways, as far as such alterations and modifications do not depart from the gist of the present invention.

For example, the present invention is applicable to a semiconductor device provided with a function of signal transmission, a functional module such as a SerDes (Serializer/Deserializer) incorporated in a semiconductor device, a mobile phone, a smartphone, a tablet terminal, and a PDA (Personal Digital Assistants). The present invention is also applicable to a personal computer, an information processing device, a communication device, and a system including these devices.

The processing of drive control for generating the drive control signal according to the exemplary embodiment described above may be executed by software using a computer provided in the transmission apparatus according to the present invention. Specifically, a computer program for performing processing of drive control may be read and executed by a CPU (not illustrated) to perform the processing of drive control. Even when processing of drive control is performed using a program, the same contents of processing as the processing of drive control according to the exemplary embodiment described above can be performed.

Further, the processing of determination for generating a determination notice signal according to the exemplary embodiment described above may be executed by software using a computer provided in the receiver apparatus according to the present invention. Specifically, a computer program for performing processing of determination may be read and executed by a CPU (not illustrated) to perform the processing of determination. Even when processing of determination is performed using a program, the same contents of processing as the processing of determination according to the exemplary embodiment described above can be performed.

The program may be stored in a non-transitory medium such as a ROM (Read Only Memory), a RAM (Random Access Memory), a semiconductor memory device such as a flash memory, an optical disc, a magnetic disk, and a magneto-optical disk.

The whole or part of the exemplary embodiments disclosed above can be described as, but not limited to, the following supplementary notes. (Supplementary note 1) A signal transmission system, comprising;

a transmission apparatus including:

a transmitting device that outputs a transmission data signal as a transmission signal using a driving ability designated by a drive control signal; and a drive control device that outputs the drive control signal, based on a transmission timing signal and a determination notice signal for notifying reception quality; and a receiver apparatus including:

a receiving device that receives the transmission signal and outputs a received signal;

a timing generating device that generates a received timing signal from the received signal; and a determining device that determines the reception quality of the received signal using the received timing signal, and outputs the determination result as the determination notice signal.

(Supplementary note 2) The signal transmission system according to Supplementary note 1, wherein the drive control device outputs the drive control signal based on the determination notice signal, designates a first ability as the driving ability when judging that the reception quality is not secured, and designates a second ability lower than the first ability as the driving ability when judging that the reception quality is secured.

(Supplementary note 3) The signal transmission system according to Supplementary note 1 or 2, wherein the drive control device outputs the drive control signal based on the transmission timing signal, and designates the driving ability in each time segment obtained by dividing a data period of the output data signal into a plurality of time segments.

(Supplementary note 4) The signal transmission system according to Supplementary note 3, wherein the determining device determines the reception quality based on whether or not a data value is matched between the plurality of time segments obtained by dividing the data period of the received signal.

(Supplementary note 5) The signal transmission system according to any one of Supplementary notes 1 to 4, wherein the determining device obtains a feature value of a signal waveform of the received signal, and determines the reception quality based on whether or not the feature value exceeds a predetermined threshold value.

(Supplementary note 6) A transmission apparatus, comprising:

a transmitting device that outputs a transmission data signal as a transmission signal using a driving ability designated by a drive control signal, and a drive control device that outputs the drive control signal, based on the determination notice signal and a transmission timing signal from a receiver apparatus that includes a receiving device that receives the transmission signal and outputs a received signal, a timing generating device that generates a received timing signal from the received signal, and a determining device that determines the reception quality of the received signal using the received timing signal, and outputs the determination result as the determination notice signal.

(Supplementary note 7) A receiver apparatus, comprising:

a receiving device that receives a transmission signal obtained by driving a transmission data signal as the transmission signal using a driving ability designated by a drive control signal, and outputs a received signal;

a timing generating device that generates a received timing signal from the received signal; and a determining device that determines the reception quality of the received signal using the received timing signal, and outputs the determination result as the determination notice signal.

(Supplementary note 8) A signal transmission method, comprising:

outputting a transmission data signal as a transmission signal using a driving ability designated by a drive control signal;

outputting the drive control signal, based on a transmission timing signal and a determination notice signal for notifying reception quality;

receiving the transmission signal, and outputting a received signal;

generating a received timing signal based on the received signal; and determining the reception quality of the received signal using the received timing signal, and outputting the determination result as the determination notice signal.

(Supplementary note 9) A transmission apparatus control program that causes a computer of a transmission apparatus that includes a transmitting device that outputs a transmission data signal as a transmission signal using a driving ability designated by a drive control signal, to execute as:

a drive control device that outputs the drive control signal, based on the determination notice signal and a transmission timing signal from a receiving device that includes a receiving device that receives the transmission signal and outputs a received signal, a timing generating device that generates a received timing signal from the received signal, and a determining device that determines the reception quality of the received signal using the received timing signal, and outputs the determination result as the determination notice signal.

(Supplementary note 10) A receiver apparatus control program that causes a computer of a receiver apparatus that includes a receiving device that receives a transmission signal obtained by driving a transmission data signal as the transmission signal using a driving ability designated by a drive control signal and outputs a received signal, and a timing generating device that generates a received timing signal from the received signal, to execute as:

a determining device that determines the reception quality of the received signal using the received timing signal, and outputs the determination result as the determination notice signal.

(Supplementary note 11) A signal transmission system, comprising:
 a transmission apparatus including:
  transmitting means that outputs a transmission data signal as a transmission signal using a driving ability designated by a drive control signal; and
  drive control means that outputs the drive control signal, based on a transmission timing signal and a determination notice signal for notifying reception quality; and
 a receiver apparatus including:
  receiving means that receives the transmission signal and outputs a received signal;
  timing generating means that generates a received timing signal from the received signal; and
  determining means that determines the reception quality of the received signal using the received timing signal, and outputs the determination result as the determination notice signal.

The invention claimed is:

1. A signal transmission system, comprising:
 a transmission apparatus including:
  hardware, including at least a processor and memory;
  a transmitting device, implemented by the hardware, that outputs a transmission data signal as a transmission signal using a driving ability designated by a drive control signal; and
  a drive control device, implemented by the hardware, that outputs the drive control signal, based on a transmission timing signal and a determination notice signal for notifying reception quality; and
 a receiver apparatus including:
  hardware, including at least a processor and memory;
  a receiving device, implemented by the hardware, that receives the transmission signal and outputs a received signal;
  a timing generating device, implemented by the hardware, that generates a received timing signal from the received signal; and
  a determining device, implemented by the hardware that determines the reception quality of the received signal using the received timing signal, and outputs a determination result as the determination notice signal.

2. The signal transmission system according to claim 1, wherein
 the drive control device outputs the drive control signal based on the determination notice signal, designates a first ability as the driving ability when judging that the reception quality is not secured, and designates a second ability lower than the first ability as the driving ability when judging that the reception quality is secured.

3. The signal transmission system according to claim 1, wherein
 the drive control device outputs the drive control signal based on the transmission timing signal, and designates the driving ability in each time segment obtained by dividing a data period of the output data signal into a plurality of time segments.

4. The signal transmission system according to claim 3, wherein
 the determining device determines the reception quality based on whether or not a data value is matched between the plurality of time segments obtained by dividing the data period of the received signal.

5. The signal transmission system according to claim 1, wherein
 the determining device obtains a feature value of a signal waveform of the received signal, and determines the reception quality based on whether or not the feature value exceeds a predetermined threshold value.

6. A transmission apparatus, comprising:
 hardware, including at least a processor and memory;
 a transmitting device, implemented by the hardware, that outputs a transmission data signal as a transmission signal using a driving ability designated by a drive control signal, and
 a drive control device, implemented by the hardware, that outputs the drive control signal, based on a determination notice signal and a transmission timing signal from a receiver apparatus that includes a receiving device that receives the transmission signal and outputs a received signal, a timing generating device that generates a received timing signal from the received signal, and a determining device that determines the reception quality of the received signal using the received timing signal, and outputs a determination result as the determination notice signal.

7. A receiver apparatus, comprising:
 hardware, including at least a processor and memory;
 a receiving device, implemented by the hardware, that receives a transmission signal obtained by driving a transmission data signal as the transmission signal using a driving ability designated by a drive control signal, the drive control signal based on a transmission timing signal and a determination notice signal from the receiving device, and outputs a received signal;
 a timing generating device, implemented by the hardware, that generates a received timing signal from the received signal; and
 a determining device, implemented by the hardware, that determines the reception quality of the received signal using the received timing signal, and outputs a determination result as the determination notice signal.

8. A signal transmission method, comprising:
 outputting a transmission data signal as a transmission signal using a driving ability designated by a drive control signal;
 outputting the drive control signal, based on a transmission timing signal and a determination notice signal for notifying reception quality;
 receiving the transmission signal, and outputting a received signal;
 generating a received timing signal based on the received signal; and
 determining the reception quality of the received signal using the received timing signal, and outputting a determination result as the determination notice signal.

9. A non-transitory computer-readable storage medium storing a transmission apparatus control program that causes a computer of a transmission apparatus that includes a transmitting device that outputs a transmission data signal as a transmission signal using a driving ability designated by a drive control signal, to:
- output the drive control signal, based on a transmission timing signal and a determination notice signal from a receiver apparatus that includes a receiving device that receives the transmission signal and outputs a received signal;
- generate a received timing signal from the received signal; and
- determine the reception quality of the received signal using the received timing signal, and outputs a determination result as the determination notice signal.

10. A non-transitory computer-readable storage medium storing a receiver apparatus control program that causes a receiving apparatus to:
- receive, by a receiving device of the receiving apparatus, a transmission signal obtained by driving a transmission data signal as the transmission signal using a driving ability designated by a drive control signal, the drive control signal based on a transmission timing signal and a determination notice signal from the receiving device, and outputs a received signal;
- generate, by, a timing generating device of the receiving apparatus, a received timing signal from the received signal;
- determine, by a computer of the receiving apparatus, the reception quality of the received signal using the received timing signal; and
- output, by the computer, a determination result as the determination notice signal.

11. A signal transmission system, comprising:
a transmission apparatus including:
- transmitting means that outputs a transmission data signal as a transmission signal using a driving ability designated by a drive control signal; and
- drive control means that outputs the drive control signal, based on a transmission timing signal and a determination notice signal for notifying reception quality; and a receiver apparatus including:
- receiving means that receives the transmission signal and outputs a received signal;
- a timing generating unit implemented at least by hardware including a processor and memory, that generates a received timing signal from the received signal; and
- determining means that determines the reception quality of the received signal using the received timing signal, and outputs a determination result as the determination notice signal.

* * * * *